(12) United States Patent
Ono et al.

(10) Patent No.: US 9,090,280 B2
(45) Date of Patent: Jul. 28, 2015

(54) POWER STEERING DEVICE

(75) Inventors: Kimiaki Ono, Susono (JP); Ikuo Kushiro, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 399 days.

(21) Appl. No.: 13/127,399

(22) PCT Filed: Dec. 26, 2008

(86) PCT No.: PCT/JP2008/073745
§ 371 (c)(1),
(2), (4) Date: May 3, 2011

(87) PCT Pub. No.: WO2010/073374
PCT Pub. Date: Jul. 1, 2010

(65) Prior Publication Data
US 2011/0209939 A1 Sep. 1, 2011

(51) Int. Cl.
*G01M 17/00* (2006.01)
*B62D 6/00* (2006.01)
*B62D 5/00* (2006.01)

(52) U.S. Cl.
CPC ............... *B62D 6/008* (2013.01); *B62D 5/008* (2013.01)
USPC ...................................................... 701/32.9

(58) Field of Classification Search
USPC ....................................................... 701/32.9
See application file for complete search history.

(56) References Cited

U.S. PATENT DOCUMENTS

| | | |
|---|---|---|
| 4,979,114 A | 12/1990 | Oshita et al. |
| 5,076,381 A | 12/1991 | Daido et al. |
| 5,828,973 A | 10/1998 | Takeuchi et al. |
| 6,079,513 A | 6/2000 | Nishizaki et al. |
| 6,496,762 B2 | 12/2002 | Kurishige et al. |
| 6,728,615 B1 | 4/2004 | Yao et al. |
| 6,736,236 B2 | 5/2004 | Kurishige et al. |
| 6,925,371 B2 | 8/2005 | Yasui et al. |
| 6,931,313 B2 | 8/2005 | Kato et al. |
| 7,275,617 B2 | 10/2007 | Endo et al. |
| 7,676,309 B2 | 3/2010 | Tamaki et al. |
| 8,046,131 B2 * | 10/2011 | Tanaka et al. ............ 701/41 |
| 2002/0005314 A1 | 1/2002 | Takehara et al. |

(Continued)

FOREIGN PATENT DOCUMENTS

| | | |
|---|---|---|
| DE | 102 60 752 A1 | 7/2004 |
| DE | 10 2004 022 098 B4 | 11/2005 |

(Continued)

OTHER PUBLICATIONS

Office Action issued Dec. 13, 2012 in German Application No. 11 2008 004 075.3 (English Translation).

(Continued)

*Primary Examiner* — Ramsey Refai
(74) *Attorney, Agent, or Firm* — Oblon, McClelland, Maier & Neustadt, L.L.P.

(57) ABSTRACT

A power steering device is mounted on a vehicle and includes a variable transmission ratio mechanism, a torque applying unit, and an applied friction torque changing unit. The torque applying unit sets an applied friction torque applied to the steering wheel and performs a control of applying the applied friction torque to the steering wheel. The applied friction torque changing unit changes the applied friction torque based on the transmission ratio of the variable transmission ratio mechanism.

11 Claims, 6 Drawing Sheets

(56) References Cited

U.S. PATENT DOCUMENTS

| | | |
|---|---|---|
| 2002/0013647 A1 | 1/2002 | Kawazoe et al. |
| 2002/0125063 A1 | 9/2002 | Kurishige et al. |
| 2003/0051560 A1 | 3/2003 | Ono et al. |
| 2003/0213641 A1 | 11/2003 | Nakano et al. |
| 2004/0019417 A1 | 1/2004 | Yasui et al. |
| 2004/0079578 A1 | 4/2004 | Kurishige et al. |
| 2005/0121252 A1 | 6/2005 | Tsuchiya |
| 2005/0209751 A1 | 9/2005 | Kato |
| 2006/0006021 A1 | 1/2006 | Takimoto et al. |
| 2006/0042860 A1 | 3/2006 | Endo et al. |
| 2007/0144824 A1 | 6/2007 | Tamaki et al. |
| 2008/0189014 A1 | 8/2008 | Tanaka et al. |
| 2010/0268421 A1 | 10/2010 | Yang et al. |
| 2011/0209939 A1 | 9/2011 | Ono et al. |
| 2011/0218708 A1 | 9/2011 | Ono et al. |

FOREIGN PATENT DOCUMENTS

| | | |
|---|---|---|
| DE | 10 2005 032 037 A1 | 2/2006 |
| DE | 10 2006 050 506 A1 | 4/2008 |
| DE | 60 2005 001 790 T2 | 4/2008 |
| JP | 62 46772 | 2/1987 |
| JP | 2000 62632 | 2/2000 |
| JP | 2002-87309 | 3/2002 |
| JP | 2002 104210 | 4/2002 |
| JP | 2002104210 * 10/2002 ............... B62D 5/04 |
| JP | 2003 34255 | 2/2003 |
| JP | 2005 343205 | 12/2005 |
| JP | 2006-175982 | 7/2006 |
| JP | 3901928 | 1/2007 |
| JP | 2009-126244 | 6/2009 |

OTHER PUBLICATIONS

International Search Report issued Feb. 24, 2009 in PCT/JP08/073745 filed Dec. 26, 2008.
Office Action dated Apr. 26, 2013, issued in U.S. Appl. No. 12/675,153.
Office Action mailed Jun. 1, 2012, in co-pending U.S. Appl. No. 12/675,153.
Office Action and Search Report issued Nov. 22, 2013 in Chinese Patent Application No. 200880132186.9 (English translation).
U.S. Office Action dated Sep. 23, 2014 in corresponding U.S. Appl. No. 12/675,153.

* cited by examiner

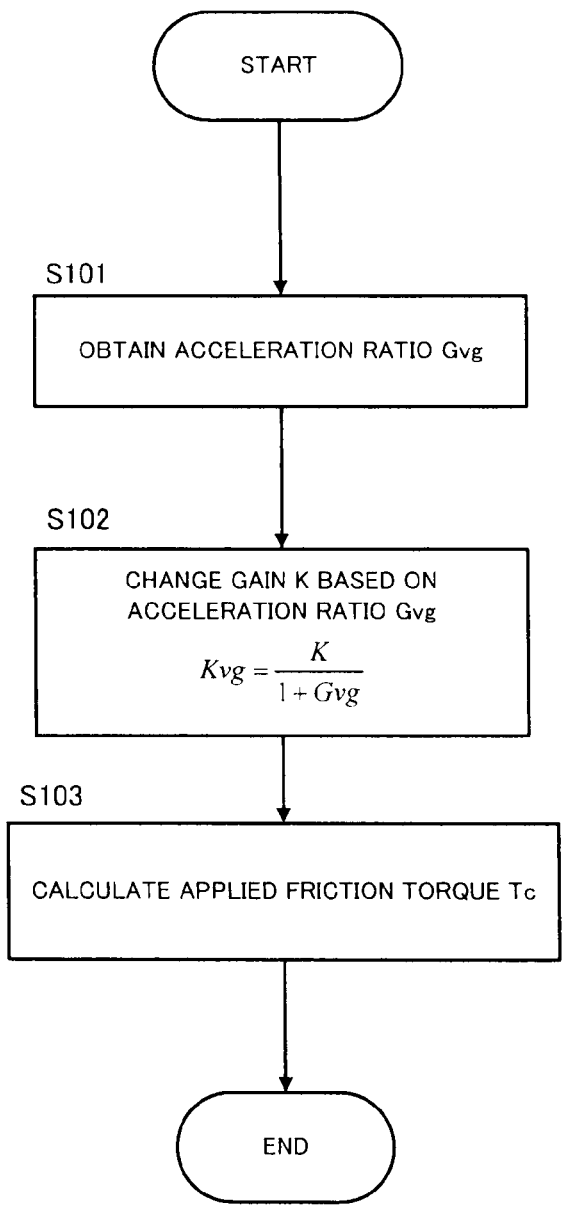

POWER STEERING DEVICE

TECHNICAL FIELD

The present invention relates to a power steering device which controls an applied friction torque applied to a steering wheel.

BACKGROUND TECHNIQUE

This kind of technique is proposed in Patent Reference-1, for example. In Patent Reference-1, there is proposed a technique which applies friction torque to a steering wheel in accordance with a steering angle and a vehicle speed, in order to improve a returning characteristic of the steering wheel at low speed and astringency of the steering wheel at high speed.
Patent Reference-1: Japanese Patent Application Laid-open under No. 2002-104210

DISCLOSURE OF INVENTION

Problem to be Solved by the Invention

By the way, when a vehicle has a variable transmission ratio mechanism such as VGRS (Variable Gear Ratio Steering), a characteristic of friction torque to be applied to a steering wheel varies in response to a variation of gear ratio (transmission ratio) by VGRS. The Patent Reference-1 does not disclose this kind of problem and means for solving the problem.

The present invention has been achieved in order to solve the above problem. It is an object of this invention to provide a power steering device capable of properly performing a control of applied friction torque applied to a steering wheel even when a transmission ratio is changed.

Means for Solving the Problem

According to one aspect of the present invention, there is provided a power steering device mounted on a vehicle including: a variable transmission ratio mechanism which changes a transmission ratio between a steering angle and a steered angle; a torque applying unit which sets applied friction torque to be applied to a steering wheel based on the steering angle and a target steering angle, and which performs a control of applying the applied friction torque to the steering wheel; and an applied friction torque changing unit which changes the applied friction torque based on the transmission ratio.

The above power steering device is mounted on a vehicle and includes a variable transmission ratio mechanism, a torque applying unit, and an applied friction torque changing unit. The torque applying unit is an ECU (Electronic Control Unit) for example, and sets applied friction torque applied to the steering wheel and performs the control of applying the applied friction torque to the steering wheel. The applied friction torque changing unit is an ECU for example, and changes the applied friction torque based on the transmission ratio of the variable transmission ratio mechanism or a parameter which correlates with the transmission ratio. Thereby, the power steering device can apply a proper applied friction torque to the steering wheel even when the transmission ratio is changed.

In a manner of the above power steering device, the applied friction torque changing unit changes a rise-up characteristic of the applied friction torque based on the transmission ratio. Thereby, the power steering device can set the applied friction torque that fits the real steering action by the driver.

In another manner of the above power steering device, the applied friction torque changing unit slows down a rise-up of the applied friction torque when a rotation of a steering shaft accelerates. Thereby, the power steering device can set the applied friction torque that fits a real steering action by the driver even when the steering wheel has accelerated by the variable transmission ratio mechanism.

In another manner of the above power steering device, the applied friction torque changing unit changes a maximum value of the applied friction torque based on the transmission ratio. Thereby, the power steering device can properly set the applied friction torque in accordance with the transmission ratio.

BRIEF DESCRIPTION OF THE DRAWINGS

FIG. 6 is a flow chart of a control process according to the first embodiment.

BRIEF DESCRIPTION OF THE REFERENCE NUMBER

Figure 1:
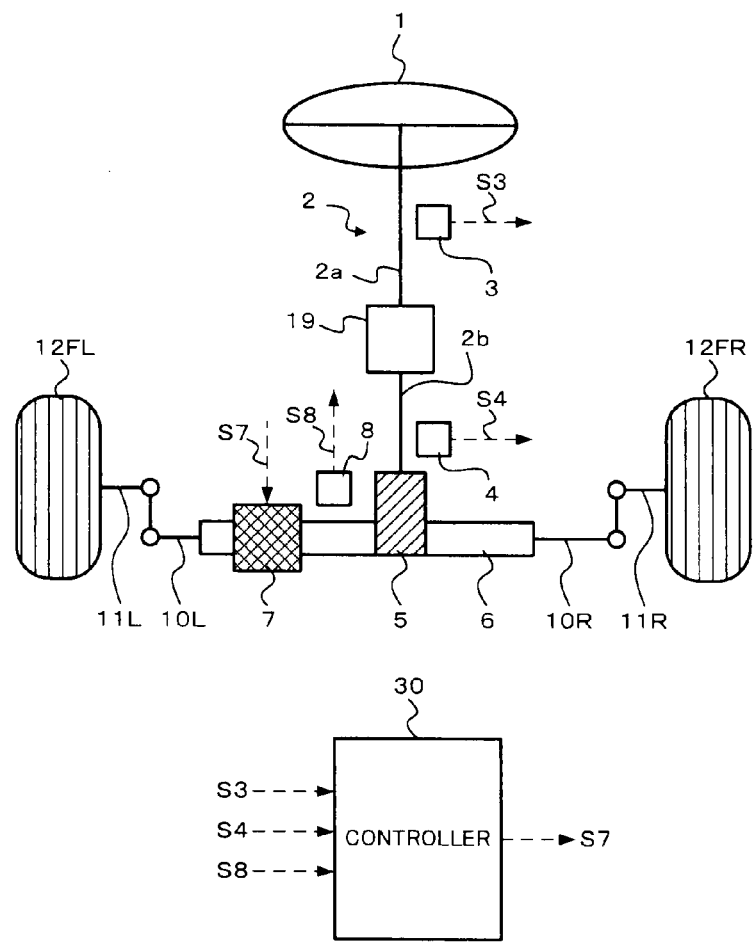
FIG. 1 is a schematic diagram illustrating a configuration of a steering control system to which a power steering device according to an embodiment is applied.

1 Steering wheel
2 Steering shaft
3 Steering angle sensor
4 Steering torque sensor
6 Steering rack
7 Motor
8 Motor rotation angle sensor
12 Wheels
30 Controller
50 Steering control system

DETAILED DESCRIPTION OF THE PREFERRED EMBODIMENTS

Preferred embodiments of the present invention will be explained hereinafter with reference to the drawings.

[Device Configuration]

First, a description will be given of an entire configuration of a system (hereinafter referred to as "steering control system") 50 to which a power steering device according to the embodiment is applied. FIG. 1 is a schematic diagram showing a configuration of the steering control system 50.

The steering control system 50 mainly includes a steering wheel 1, a steering shaft 2, a steering angle sensor 3, a steering torque sensor 4, a pinion 5, a steering rack 6, a motor 7, a motor rotation angle sensor 8, tie rods 10R and 10L, knuckle arms 11R and 11L, wheels (front wheels) 12FR and 12FL, a vehicle speed sensor, and a controller 30. Hereinafter, when each of the tie rods 10R and 10L, each of the knuckle arms 11R and 11L, and each of the wheels 12FR and 12FL are not distinguished from each other, "R" and "L" at the end of the reference numerals will be omitted.

The steering control system 50 is formed by the electric power steering (EPS: Electric Power Steering) system. Concretely, the steering control system 50 is mounted on a vehicle, and steers the front wheels 12F (steered wheels) in accordance with the operation of the steering wheel 1.

The steering wheel 1 is operated by the driver for turning the vehicle. The steering wheel 1 is connected to the pinion 5 via the steering shaft 2. The steering angle sensor 3 and the steering torque sensor 4 are mainly provided on the steering shaft 2.

The pinion 5 rotates in response to the rotation of the steering shaft 2. The steering rack 6 moves in response to the rotation of the pinion 5. The knuckle arms 11 are connected to the steering rack 6 via the tie rods 10, and the wheels 12F are connected to the knuckle arms 11. In this case, when the tie rods 10 and the knuckle arms 11 are operated by the steering rack 6, the wheels 12F connected to the knuckle arms 11 are steered.

The motor 7 may be a three-phase AC motor, for example. The motor 7 is provided within the steering-gear box (not shown) and is coaxial with the steering rack 6. The motor 7 can apply a force which assists the movement of the steering rack 6 or a force which prevents the movement of the steering rack 6. Concretely, the motor 7 generates the assist torque in the steering direction by the driver in order to improve the steering feeling and the steering stability. In contrast, the motor 7 generates the applied friction torque in a direction opposite to the steering direction by the driver in order to improve the steering keeping performance. In other words, the motor 7 generates a steering reaction force. The motor 7 is controlled by a control signal S7 supplied by the controller 30.

Various kinds of sensors provided within the steering control system 50 function as follows. The steering angle sensor 3 detects the steering angle corresponding to the operation of the steering wheel 1 by the driver, and supplies a detecting signal S3 corresponding to the detected steering angle to the controller 30. The steering torque sensor 4 detects the steering torque generated by the operation by the driver, and supplies the controller 30 with a detecting signal S4 corresponding to the detected steering torque. The motor rotation angle sensor 8 detects the rotation angle of the motor 7, and supplies the controller 30 with a detecting signal S8 corresponding to the detected rotation angle. The vehicle speed sensor detects the vehicle speed (for example, by detecting the wheel speed), and supplies the controller 30 with a detecting signal corresponding to the detected vehicle speed.

A variable transmission ratio mechanism 19 is a mechanism which can accelerate (or decelerate) the rotation of the steering shaft 2 transmitted to the pinion 5. Namely, the variable transmission ratio mechanism 19 changes the transmission ratio between the steering angle and the steered angle. The variable transmission ratio mechanism 19 is VGRS, for example. Concretely, the variable transmission ratio mechanism 19 includes a motor and a variable gear train, and connects the input shaft 2a and the output shaft 2b of the steering shaft 2 by the variable gear train. Hereinafter, "transmission ratio" means a ratio of the rotation of the output shaft 2b with respect to the rotation of the input shaft 2a. When the variable transmission ratio mechanism 19 accelerates the rotation of the steering shaft 2, i.e., when the transmission ratio is equal to or larger than 1, it is simply expressed as "the time of accelerating the shaft". Also, when the variable transmission ratio mechanism 19 decelerates the rotation of the steering shaft 2, i.e., when the transmission ratio is smaller than 1, it is simply expressed as "the time of decelerating the shaft".

The controller 30 includes a CPU, a ROM, a RAM, and an A/D converter, which are not shown. The controller 30 executes the control of the motor 7 by supplying the motor 7 with the control signal S7 based on the detecting signals S3, S4, S8 and S15, supplied from the above-mentioned various kinds of sensors. In this embodiment, the controller 30 executes the control of making the motor 7 apply the applied friction torque to the steering wheel 1 (hereinafter, the control is referred to as "friction applying control"). In this way, the controller 30 functions as the power steering device in the present invention. The controller 30 may be realized by the ECU (Electronic Control Unit), which controls the vehicle.

[Example of Friction Applying Control]

Now, a description will be given of an example of the friction applying control performed by the controller 30. Here, the following example of the friction applying control does not consider the presence of the variable transmission ratio mechanism 19. A description will be given, in the first embodiment and the second embodiment, of the friction applying control which considers the presence of the variable transmission ratio mechanism 19.

First, the controller 30 calculates the friction torque (hereinafter expressed by "$T_t$") applied to the steering wheel 1 based on the steering angle (hereinafter expressed by "θ") and the vehicle speed (hereinafter expressed by "V"). Next, the controller 30 calculates the target steering angle (hereinafter expressed by "$θ_t$") based on the steering angle θ and the friction torque $T_t$. Then, the controller 30 calculates the applied friction torque (hereinafter expressed by "$T_c$") based on the deviation (hereinafter expressed by "Δθ") between the target steering angle $θ_t$ and the steering angle θ. In other words, the controller 30 corrects the friction torque $T_t$ based on the target steering angle $θ_t$, and sets the corrected friction torque to the applied friction torque $T_c$. Then, the controller 30 executes the control of the motor 7 such that the above applied friction torque $T_c$ is applied to the steering wheel 1.

Now, a concrete description will be given of the friction applying control, with reference to FIG. 2 to FIG. 4.

Figure 2:
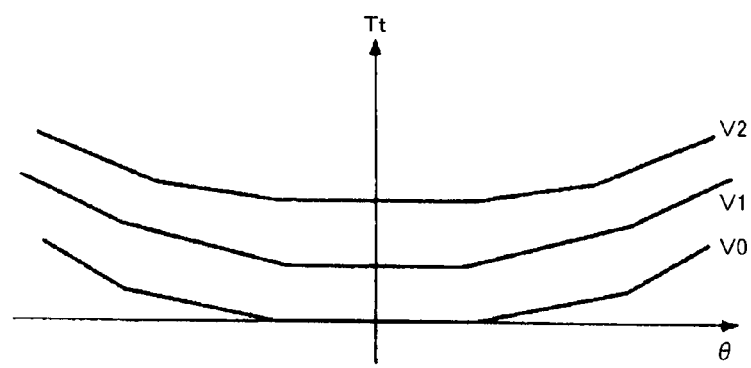
FIG. 2 is a diagram illustrating an example of a method for calculating the friction torque.

FIG. 2 shows an example of a method for calculating the friction torque $T_t$. In FIG. 2, a horizontal axis shows the steering angle θ, and a vertical axis shows the friction torque $T_t$. More concretely, FIG. 2 corresponds to maps defining the friction torque $T_t$ to be set with respect to the steering angle θ. Here, as an example, FIG. 2 shows the maps which corresponds to a high speed range V2, a middle speed range V1 and a low speed range V0, respectively. The controller 30 calculates the friction torque $T_t$ corresponding to the present steering angle θ and the vehicle speed V by referring to the maps mentioned above.

According to the maps shown in FIG. 2, if the steering angle θ is constant, the greater the vehicle speed is, the greater the friction torque $T_t$ set becomes. The reason is as follows. In the high speed range V2 or the middle speed range V1, it is desirable to generate a relatively-large friction torque in terms of the improvement of stability in traveling straightforward as well as the reduction of the power and the improvement of stability in maintaining the steering angle. On the contrary, in the low speed range V0, the increased friction torque $T_t$ tends to bring a strange feeling to the driver and thus degrades the steering feeling. Further, according to the maps shown in FIG. 2, if the vehicle speed is constant or in the same vehicle-speed range, the greater the steering angle θ is, the greater the set friction torque $T_t$ becomes. This is because a large lateral load tends to be generated due to the increased steered angle of the wheel when the magnitude of the steering angle θ is large, and thus a large friction torque is required in terms of the reduction of the power required to maintain the steering angle and the improvement of stability in maintaining the steering angle.

Next, a description will be given of a method for calculating the target steering angle $θ_t$ based on the friction torque $T_t$ calculated as described above. The controller 30 calculates the target steering angle $θ_t$ based on the deviation $Δθ(=θ_t−θ)$ between the target steering angle $θ_t$ and the steering angle θ, and the upper limit value of the deviation $Δ(=T_t/K)$ defined by the friction torque $T_t$ and a gain K. Concretely, the controller 30 initializes the target steering angle $θ_t$ to the steering angle θ at first (does not initialize if the target steering angle $θ_t$ has already been initialized). Then, the controller 30 calculates the deviation $Δθ(=θ_t−θ)$. Thereafter, if the controller 30 determines "Δθ>Δ", the controller 30 changes the target steering angle $θ_t$ to "$θ_t=θ−Δ$". If the controller 30 determines "Δθ<−Δ", the controller 30 changes the target steering angle $θ_t$ to "$θ_t=θ−Δ$". If the controller 30 determines "−Δ≤Δθ≤Δ", the controller 30 does not change the target steering angle $θ_t$. Here, the gain K is a value determined in consideration of rigidity of the steering system, for example.

Next, a description will be given of a method for calculating the applied friction torque $T_c$ based on the target steering angle $θ_t$ calculated as described above. The controller 30 calculates the applied friction torque $T_c$ based on the deviation $Δθ(=θ_t−θ)$ obtained by the target steering angle $θ_t$ and the gain $K(=T_t/Δ)$. Concretely, the controller 30 calculates the applied friction torque $T_c$ by the following formula: "$T_c=K·Δθ$", namely "$T_c=K(θ_t−θ)$"

Figure 3:
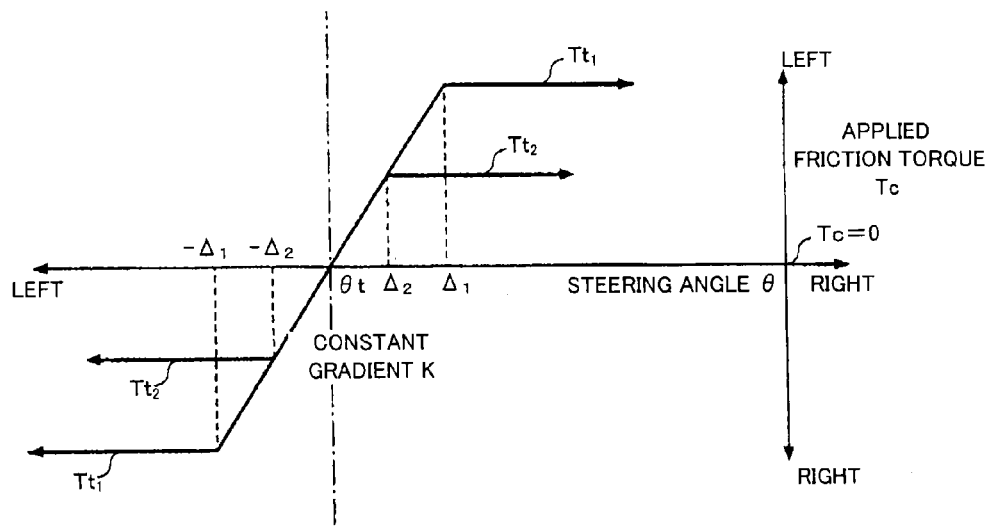
FIG. 3 is a diagram illustrating an example of a characteristic of applied friction torque.

FIG. 3 is a diagram illustrating an example of characteristics of the applied friction torque $T_c$. In FIG. 3, the horizontal axis shows the steering angle θ, and the vertical axis shows the applied friction torque $T_c$ (the torque of the left turn direction is defined as a positive torque, and the torque of the right turn direction is defined as a negative torque). Here, there are shown a case where the friction torque $T_t$ is "$T_{t1}$" and a case where the friction torque $T_t$ is "$T_{t2}$" ($T_{t2}<T_{t1}$), as examples. For example, FIG. 3 shows the friction torque "$T_{t1}$" when the vehicle speed is in the high speed range V2 or middle speed range V1, and the friction torque "$T_{t2}$" when the vehicle speed is in the low speed range V0 (See. FIG. 2). Further, in FIG. 3, in either case of "$T_{t1}$" and "$T_{t2}$", for better understanding and for the sake of convenience, it is assumed that the target steering angle $θ_t$ is constant and is not changed by the change of the steering angle θ. It is noted that if the target steering angle $θ_t$ changes, then the graph is merely translated along the horizontal axis according to a new target steering angle $θ_t$.

As shown in FIG. 3, since the upper limit value of the deviation Δ has the relationship "$Δ=T_t/K$", the greater the friction torque $T_t$ is, the greater the upper limit value of the deviation Δ becomes (for example, the upper limit value of the deviation $Δ_1$ in the case of "$T_{t1}$" is larger than the upper limit value of the deviation $Δ_2$ in the case of "$T_{t2}$". Further, in the range of "−Δ≤Δθ≤Δ", the target steering angle $θ_t$ is kept unchanged, and the magnitude of the applied friction torque $T_c$ increases in proportion to Δθ because of the relationship "$T_c=K·Δθ$", i.e., "$T_c=K(θ_t−θ)$". In the range of "Δθ>Δ" and "Δθ<−Δ", the target steering angle $θ_t$ is changed as mentioned above and the magnitude of Δθ becomes constant. Thus, because of the relationship "$T_c=K·Δθ$", i.e., "$T_c=K(θ_t−θ)$", the magnitude of the applied friction torque $T_c$ becomes a constant value according to the friction torque $T_t$. In this case, in the range of "−Δ≤Δθ≤Δ", the friction torque $T_t$ to be applied to the steering wheel 1 is not actually applied to the steering wheel 1. The magnitude of the applied friction torque $T_c$ is set to the magnitude of the friction torque $T_t$ to be applied to the steering wheel 1 only when an absolute value of Δθ becomes equal to or larger than the upper limit value of the deviation Δ. Namely, the gain K is a parameter which determines the rise-up characteristic of the applied friction torque $T_c$ (here, indicating the changing rate of the applied friction torque $T_c$ with respect to Δθ). In the range of "−Δ≤Δθ≤Δ", the friction torque $T_t$ is not applied to the steering wheel 1 so that the sensitive vibration of the friction torque and the degradation of the steering feeling can be suppressed.

Figure 4A:
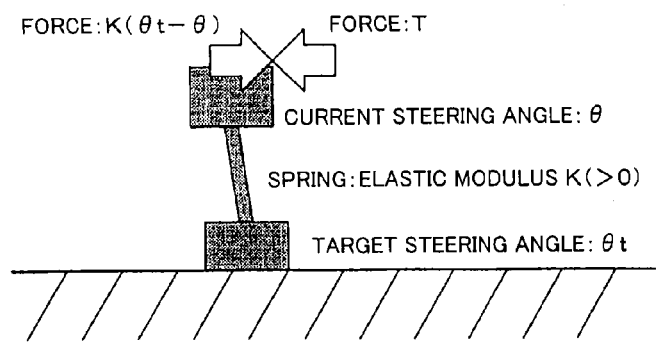
FIGS. 4A and 4B are image diagrams of a model for visualizing the characteristic of the applied friction torque.
Figure 4B:
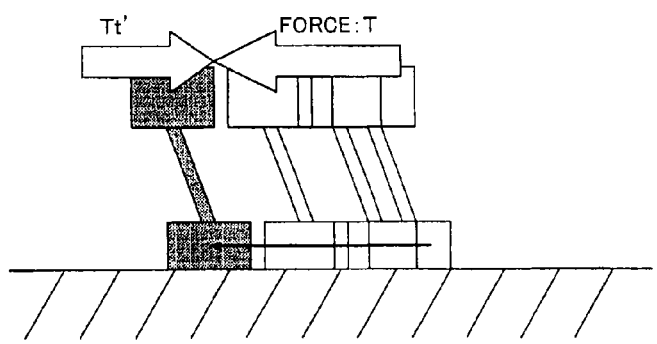

FIGS. 4A and 4B show image diagrams of a model for visualizing the characteristics of the applied friction torque $T_c$. FIG. 4A is an image diagram corresponding to the range of "−Δ≤Δθ≤Δ". In this case, the target steering angle $θ_t$ does not change, and a force which is balanced with a force T (for example, an external force generated due to an input to the vehicle wheel), i.e., an elastic force (=K·Δθ) when a spring having an elastic modulus K (=gain K) deforms by the amount of deformation ($θ_t−θ$), is generated. FIG. 4B is an image diagram corresponding to the range of "Δθ>Δ" and "Δθ<−Δ". In this case, the target steering angle $θ_t$ changes in a direction where the force T is applied to the target steering angle $θ_t$, and a constant friction force $T_t'$ (which is smaller than the force T) is generated in an opposite direction of the force T. Here, the friction force $T_t'$ corresponds to a value obtained by converting the friction torque $T_t$ to a force dimension.

Preferably, the controller 30 filters the applied friction torque $T_c$ with a low-pass filter. For example, the controller 30 multiplies the applied friction torque $T_c$ by the following equation (1) corresponding to the low-pass filter.

$$\frac{1}{f_c \times s + 1} \quad (1)$$

Here, "$f_c$" indicates a cutoff frequency, and "s" indicates a parameter in the low-pass filter. The cutoff frequency $f_c$ is desired to be a fixed or variable value within a range between approximately 1 to 2 Hz. This is because a yaw resonance frequency of the vehicle exists in the frequency range, and thus a variation in friction torque is adequately filtered, which improves the steering feeling. Since the yaw resonance frequency of the vehicle varies with the vehicle speed, the cutoff frequency $f_c$ may be changed according to the vehicle speed. Alternatively, as a simple example, the cutoff frequency $f_c$ may be set to a fixed value which corresponds to the yaw resonance frequency of the vehicle at a representative vehicle speed (for example, 80 km/h).

In the following first and second embodiments, the controller 30 further changes the applied friction torque $T_c$ based on the transmission ratio of the variable transmission ratio mechanism 19 or a parameter which correlates with the transmission ratio.

First Embodiment

First, a description will be given of a method of changing the applied friction torque $T_c$ in the first embodiment. In the first embodiment, the controller 30 changes a rise-up characteristic of the applied friction torque based on the transmission ratio of the variable transmission ratio mechanism 19. Thereby, the controller 30 properly sets the applied friction torque $T_c$.

Concretely, the controller 30 obtains the transmission ratio of the variable transmission ratio mechanism 19, and then changes the gain K in accordance with the transmission ratio. For example, the controller 30 obtains the transmission ratio from the variable transmission ratio mechanism 19. Then, when the transmission ratio is equal to or larger than 1, i.e., at the time of accelerating the shaft, the controller 30 decreases the gain K in accordance with the transmission ratio. For example, the controller 30 sets the gain K to be in inverse proportion to the transmission ratio. In other words, the controller 30 calculates a gain "$K_{vg}$" after the change as the equation (2) by using an acceleration ratio (hereinafter, referred to as "acceleration ratio Gvg") of the rotation of the output shaft 2b with respect to the rotation of the input shaft 2a.

$$Kvg = \frac{K}{1 + Gvg} \quad (2)$$

In the equation (2), the controller 30 calculates the gain $K_{vg}$ by dividing the gain K by the transmission ratio (i.e., "$1+G_{vg}$"). Thereby, the controller 30 properly changes the applied friction torque $T_c$ based on the transmission ratio.

Next, a description will be given of the advantageous effect in the first embodiment. Normally, in order to obtain the steering angle θ with high accuracy, the steering angle θ is estimated by using the rotation angle of the motor 7 detected by the motor rotation angle sensor 8. Meanwhile, the rotation angle of the motor 7 is affected by the transmission ratio of the variable transmission ratio mechanism 19. Namely, as a result of the rotation angle of the motor 7 amplified according to the transmission ratio, the variation of the steering angle θ estimated based on the rotation angle of the motor 7 becomes larger than the variation of the real steering angle (hereinafter referred to as "real steering angle") by the driver's steering operation. In addition, the controller 30 calculates the applied friction torque $T_c$ based on the steering angle θ as mentioned in the section "Example of Friction Applying Control". Thus, when the variable transmission ratio mechanism 19 is working, the applied friction torque $T_c$ is not properly set due to the fact that the steering angle θ detected is different from the real steering angle, and hence there is a possibility that the steering feeling deteriorates.

In contrast, in the first embodiment, the controller 30 changes the gain K according to the transmission ratio. Thereby, the controller 30 properly changes the rise-up characteristic of the applied friction torque $T_c$, and sets the applied friction torque $T_c$ that fits the real steering angle. This will be described with reference to FIG. 5.

Figure 5:
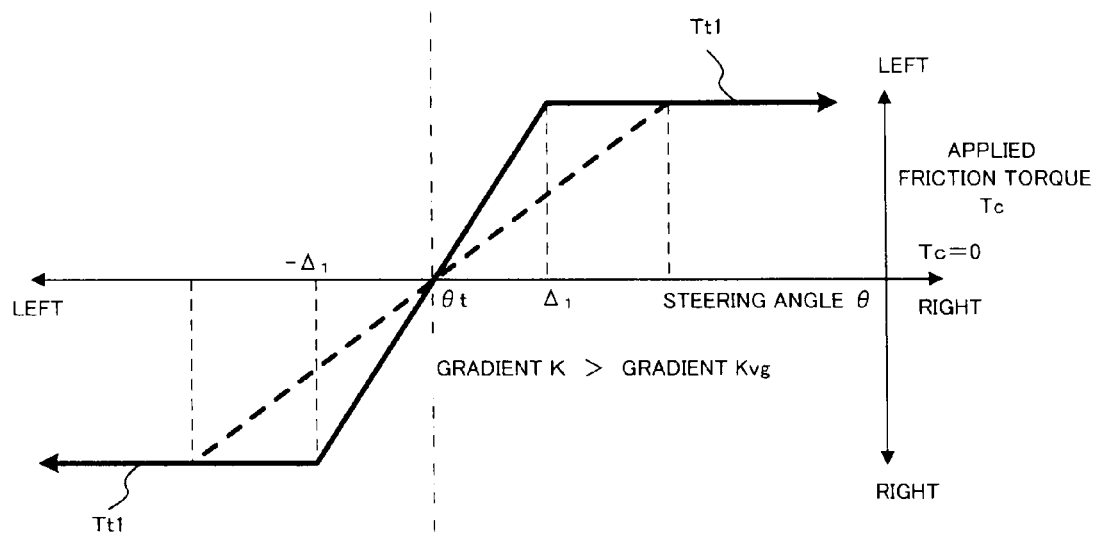
FIG. 5 is a diagram illustrating an example of a characteristic of the applied friction torque in the first embodiment.

FIG. 5 is a diagram illustrating an example of the characteristic of the applied friction torque $T_c$ at the time of accelerating the shaft. Graphs in FIG. 5 are in a case where the friction torque $T_f$ is "$T_f 1$". In FIG. 5, the solid line shows the graph of the applied friction torque $T_c$ using the gain K without consideration of the transmission ratio, and the broken line shows the graph of the applied friction torque $T_c$ using the gain K with consideration of the transmission ratio. As shown in the FIG. 5, at the time of accelerating the shaft, the gain $K_{vg}$ is in inverse proportion to the transmission ratio and is smaller than the gain K. Namely, the applied friction torque $T_c$ calculated by using the gain $K_{vg}$ rises slowly in comparison with the applied friction torque $T_c$ calculated by using the gain K.

Also, as described above, in accordance with the transmission ratio, the variation of the detected steering angle θ is larger than that of the real steering angle. Thus, the controller 30 can properly set the applied friction torque $T_c$ based on the real steering angle by changing the gain K in accordance with the transmission ratio.

(Process Flow)

Next, a description will be given of a procedure of the process in the first embodiment. FIG. 6 is an example of a flow chart showing a procedure executed by the controller 30 in the first embodiment. This process is repeatedly executed by the controller 30 in a predetermined cycle.

First, the controller 30 obtains the acceleration ratio $G_{vg}$ (step S101). For example, the controller 30 obtains the acceleration ratio $G_{vg}$ from the control signals sent from the variable transmission ratio mechanism 19.

Next, the controller 30 changes the gain K based on the acceleration ratio $G_{vg}$ (step S102). Concretely, the controller 30 calculates the gain $K_{vg}$ from the acceleration ratio $G_{vg}$ by using the equation (2).

Then, the controller 30 calculates the applied friction torque $T_c$ (step S103). In this case, the controller 30 calculates the applied friction torque $T_c$ by using the changed gain $K_{vg}$. Therefore, the controller 30 can properly set the applied friction torque $T_c$ in consideration of the transmission ratio. Thus, the controller 30 can prevent an aggravation of the steering feeling due to the variable transmission ratio mechanism 19.

(First Modification)

In the above explanation, at the time of accelerating the shaft, the controller 30 calculates the gain $K_{vg}$ by dividing the gain K by the transmission ratio, as indicated by the equation (2). However, the method of determining the gain $K_{vg}$ which can be applied to the present invention is not limited to this method. For example, the controller 30 may set the gain $K_{vg}$ from the transmission ratio at the time of accelerating the shift by referring to a map or an equation. In this case, the map or the equation is prepared by experimental trials, and stored in a memory of the controller 30 in advance.

(Second Modification)

In the above explanation, at the time of accelerating the shaft, the controller 30 decreases the gain K based on the transmission ratio. Besides this, at the time of decelerating the shaft, the controller 30 may increase the gain K based on the transmission ratio. At the time of decelerating the shaft, the variation of the real steering angle is larger than the variation of the detected steering angle θ. Therefore, the controller 30 calculates the gain $K_{vg}$ after the change by dividing the gain K by the transmission ratio, for example. Thereby, the gain $K_{vg}$ increases in accordance with the transmission ratio. Thus, the controller 30 can properly set the applied friction torque $T_c$ based on the real steering angle, even at the time of the decelerating the shaft, by changing the gain K in accordance with the transmission ratio.

(Third Modification)

In the above explanation, at the time of accelerating the shaft, the controller 30 changes the gain K based on the transmission ratio. Instead, the controller 30 may change the cutoff frequency $f_c$ based on the transmission ratio. In this case, the controller 30 sets the cutoff frequency $f_c$ with reference to a map or an equation which indicates a proper value of the cutoff frequency $f_c$ corresponding to the transmission ratio. The map or the equation is prepared by experimental trials, and stored in a memory of the controller 30 in advance. By changing the cutoff frequency $f_g$ in this way, the controller 30 can also adjust the variation of the applied friction torque $T_c$, and change the rise-up characteristic.

Second Embodiment

In the first embodiment, the controller 30 changes the rise-up characteristic of the applied friction torque $T_c$ by changing the gain K. Besides this or instead of this, in the second embodiment, the controller 30 changes the friction torque $T_f$ to a proper value. Thereby, the controller 30 properly sets the applied friction torque $T_c$. Hereinafter, the friction torque $T_f$ after the change will be particularly expressed as "$T_{fvg}$".

The controller 30 changes the gain K and the friction torque $T_f$ based on a target angular velocity (hereinafter, referred to as "target angular velocity $\omega_{vg}$") of the output shaft 2b which is used by the variable transmission ratio mechanism 19. Here, "target angular velocity $\omega_{vg}$" indicates a relative angular velocity of the output shaft 2b with respect to the input shaft 2a, for example. Therefore, the target angular velocity $\omega_{vg}$ is a positive value at the time of accelerating the shaft, and is a negative value at the time of decelerating the shaft. Hereinafter, for convenience of explanation, the steering in a counterclockwise direction is not distinguished from the steering in a clockwise direction. Namely, a sign in the target angular velocity does not vary by the difference between the steering in the counterclockwise direction and the steering in the clockwise direction.

Concretely, the controller 30 calculates the proper gain K and the friction torque $T_{fvg}$ from the target angular velocity $\omega_{vg}$ with reference to maps or equations of the gain $K_{vg}$ corresponding to the target angular velocity $\omega_{vg}$ and the friction torque $T_{fvg}$ corresponding to the target angular velocity $\omega_{vg}$. These maps and equations are prepared by experimental trials, and stored in a memory of the controller 30 in advance.

Figure 7A:
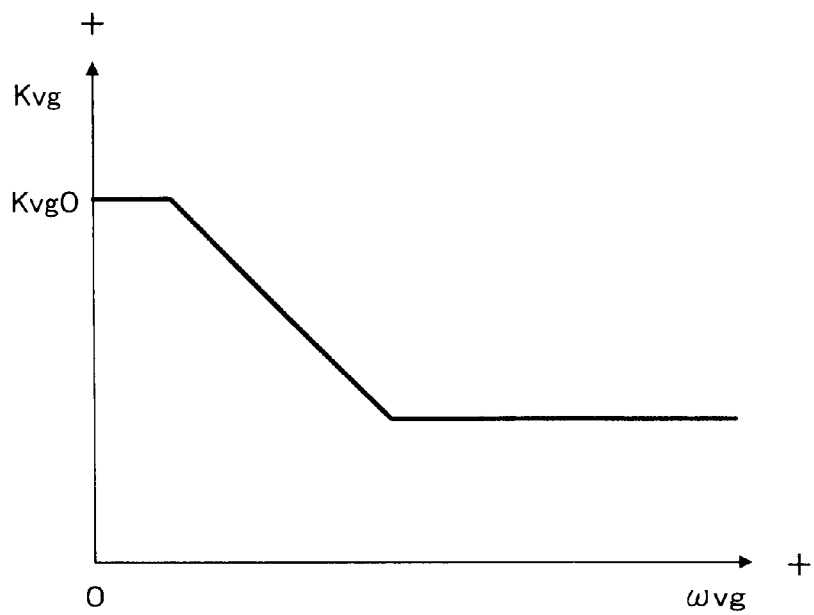
FIGS. 7A and 7B are examples of maps representing proper values of gain $K_{vg}$ and friction torque $T_{fvg}$ with respect to the target angular velocity $\omega_{vg}$.

FIG. 7A is an example of a map showing a proper value of the gain $K_{vg}$ corresponding to the target angular velocity $\omega_{vg}$. As shown in FIG. 7A, the controller 30 decreases the gain $K_{vg}$ when the target angular velocity $\omega_{vg}$ is large. Namely, at the time of accelerating the shaft, the controller 30 slows down the rise-up of the applied friction torque $T_c$. Here, "$K_{vg}0$" in FIG. 7A, for example, coincides with the gain K calculated without considering the target angular velocity $\omega_{vg}$. In this way, the controller 30 adjusts the rise-up characteristic of the applied friction torque $T_c$ and achieves proper steering feeling.

Figure 7B:
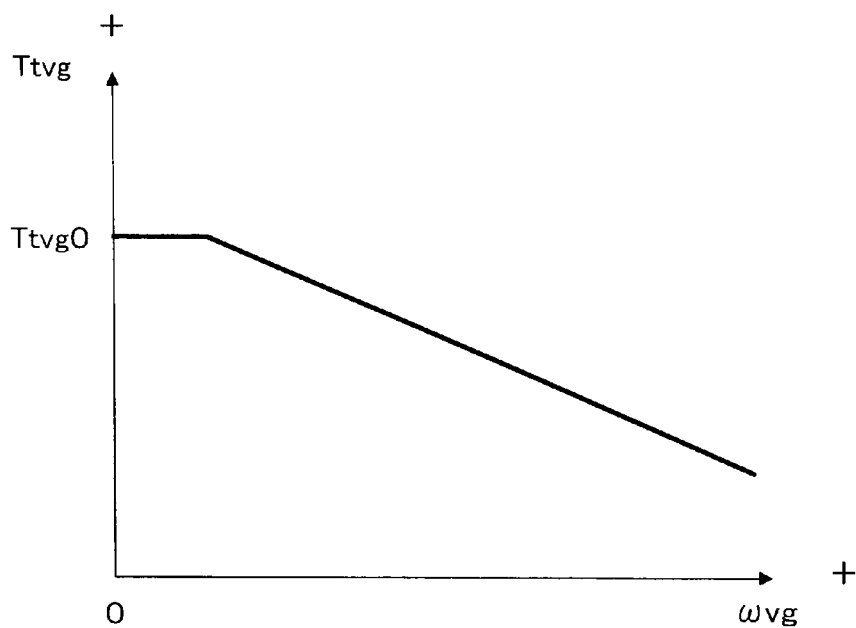

FIG. 7B is an example of a map showing a proper value of the friction torque $T_{fvg}$ corresponding to the target angular velocity $\omega_{vg}$. As shown in the FIG. 7B, the larger the target angular velocity $\omega_{vg}$ is, the smaller the friction torque $T_{fvg}$ is. Namely, at the time of accelerating the shaft, the controller 30 decreases the maximum value of the applied friction torque $T_c$. Here, "$T_{fvg}0$" in FIG. 7B coincides with the friction torque $T_f$ calculated without considering the target angular velocity $\omega_{vg}$, for example. In this way, the controller 30 decreases the maximum value of the applied friction torque $T_c$, and achieves proper steering feeling.

Meanwhile, at the time of decelerating the shaft at which the target angular velocity $\omega_{vg}$ is a negative value, the controller 30 sets the gain $K_{vg}$ to "$K_{vg}0$" and the friction torque $T_{fvg}$ to "$T_{fvg}0$", for example.

(Process Flow)

Figure 8:
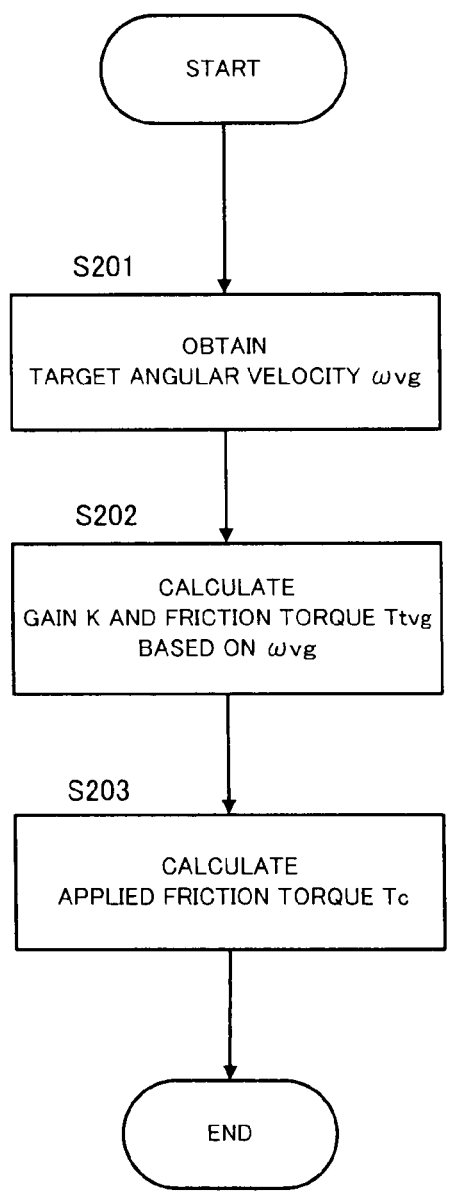
FIG. 8 is a flow chart of a control process according to the second embodiment.

Next, a description will be given of a procedure of the process in the second embodiment. FIG. 8 is an example of a flow chart showing a procedure executed by the controller 30 in the second embodiment. This process is repeatedly executed by the controller 30 in a predetermined cycle.

First, the controller 30 obtains the target angular velocity $\omega_{vg}$ (step S201). For example, the controller 30 obtains the target angular velocity $\omega_{vg}$ from the control signals sent from the variable transmission ratio mechanism 19.

Next, the controller 30 calculates the gain $K_{vg}$ and the friction torque $T_{fvg}$ based on the target angular velocity $\omega_{vg}$ (step S202). Concretely, the controller 30 derives the gain $K_{vg}$ and the friction torque $T_{fvg}$ by using the maps or the equations shown in FIGS. 7A and 7B.

Then, the controller 30 calculates the applied friction torque $T_c$ (step S203). At this time, the controller 30 calculates the applied friction torque $T_c$ by using the gain $K_{vg}$ and the friction torque $T_{fvg}$ calculated at step S202. Therefore, the controller 30 can set the rise-up characteristic and the maximum value of the applied friction torque $T_c$ in accordance with the target angular velocity $\omega_{vg}$. Namely, the controller 30 can properly set the applied friction torque $T_c$.

(First Modification)

In the second embodiment, the controller 30 changes the applied friction torque $T_c$ by using the target angular velocity $\omega_{vg}$, which is an example of controlled amount of the variable transmission ratio mechanism 19. However, an example to which the present invention can be applied is not limited to the above example. For example, the controller 30 may change the applied friction torque $T_c$ based on the acceleration ratio or the transmission ratio like the first embodiment. In this case, the controller 30 may calculate the gain $K_{vg}$ and the friction torque $T_{fvg}$ based on the acceleration ratio or the transmission ratio, for example, with reference to a map prepared in advance.

(Second Modification)

In the first embodiment and the second embodiment, by changing the gain K, the controller 30 changes the rise-up characteristic of the applied friction torque $T_c$. However, instead of this or besides this, the controller 30 may change the cutoff frequency $f_c$ based on the transmission ratio and/or the target angular velocity $\omega_{vg}$. In this case, the controller 30 sets the cutoff frequency $f_c$, for example, with reference to a map or an equation which indicates the proper value of the cutoff frequency $f_c$ corresponding to each of the transmission ratios. The map or the equation is prepared by experimental trials, and stored in a memory of the controller 30 in advance. Thus, the controller 30 can adjust the variation of the applied friction torque $T_c$ and change the rise-up characteristic by changing the cutoff frequency $f_c$.

(Third Modification)

In the second embodiment, the controller 30 changes both the friction torque $T_f$ and the gain K. Instead, the controller 30 may change only the friction torque $T_f$.

INDUSTRIAL APPLICABILITY

This invention can be used for a mechanism which is installed in a vehicle and which assists a steering operation of the driver.

The invention claimed is:

1. A power steering device mounted on a vehicle, comprising:
   a variable transmission ratio mechanism which changes a transmission ratio between a real steering angle and a steered angle;
   a friction torque setting unit which sets a friction torque applied to a steering wheel based on an operating condition of the vehicle;
   a target steering angle setting unit which sets a target steering angle based on the friction torque;

a torque applying unit which sets an applied friction torque based on a deviation between the target steering angle and a steering angle and which performs a control of applying the applied friction torque to the steering wheel; and an applied friction torque changing unit which changes the applied friction torque based on the transmission ratio.

2. The power steering device according to claim 1, wherein the applied friction torque changing unit changes a rise-up characteristic of the applied friction torque based on the transmission ratio.

3. The power steering device according to claim 2, wherein the applied friction torque changing unit slows down a rise-up of the applied friction torque when a rotation of a steering shaft accelerates.

4. The power steering device according to claim 1, wherein the applied friction torque changing unit changes a maximum value of the applied friction torque based on the transmission ratio.

5. The power steering device according to claim 1, wherein the friction torque setting unit sets the friction torque applied to the steering wheel based on the steering angle and a vehicle speed.

6. A power steering device mounted on a vehicle according to claim 1, further comprising:

a motor for generating the applied friction torque in a direction opposite to a steering direction of the steering wheel.

7. A power steering device mounted on a vehicle according to claim 1, wherein the target steering angle setting unit calculates the target steering angle based on a deviation between a previous target steering angle and the steering angle, and based on the friction torque and a variable gain.

8. A power steering device mounted on a vehicle according to claim 7, further comprising:

a gain changing unit which changes the variable gain in accordance with an inverse of the transmission ratio such that a rise-up characteristic of the applied friction torque is changed based on the transmission ratio.

9. A power steering device mounted on a vehicle according to claim 1, wherein the variable transmission ratio mechanism includes a first motor and a variable gear train.

10. A power steering device mounted on a vehicle according to claim 9, wherein the torque applying unit includes a second motor that is coaxial with a steering rack.

11. A power steering device mounted on a vehicle according to claim 1, wherein the steering angle upon which the torque applying unit sets the applied friction torque has a variation greater than a variation of the real steering angle.

* * * * *